No. 764,886. PATENTED JULY 12, 1904.
J. G. DONNENWERTH.
LUBRICATOR.
APPLICATION FILED JUNE 11, 1903.
NO MODEL.

Witnesses

J. G. Donnenwerth, Inventor

By C. A. Snow & Co.
Attorneys

No. 764,886.

Patented July 12, 1904.

UNITED STATES PATENT OFFICE.

JOHN G. DONNENWERTH, OF BROOKFIELD, MISSOURI, ASSIGNOR OF ONE-HALF TO WILLIAM J. DONNENWERTH, OF CHARITON, IOWA.

LUBRICATOR.

SPECIFICATION forming part of Letters Patent No. 764,886, dated July 12, 1904.

Application filed June 11, 1903. Serial No. 161,045. (No model.)

*To all whom it may concern:*

Be it known that I, JOHN G. DONNENWERTH, a citizen of the United States, residing at Brookfield, in the county of Linn and State of Missouri, have invented a new and useful Lubricator, of which the following is a specification.

This invention relates to certain improvements in devices of that class employed for lubricating the cylinders.

The principal object of the invention is to provide a device of this character in which the lubricating material is supplied in regular predetermined quantities to the moving parts so long as the latter remain in operation.

A further object of the invention is to provide a lubricating device in which the lubricant is forced by a pump or similar pressure mechanism to the device to be lubricated and thence carried to the proper point by the steam or other fluid under pressure employed as a motive power.

A still further object of the invention is to provide, in piston lubrication, for the employment of a fibrous or finely-divided filling for the piston, the oil being conveyed under pressure to this finely-divided material and thoroughly saturating the same and said material being constantly subjected to the action of steam, which forces it in finely-divided condition to the peripheral surface of the piston, thus effecting an equal distribution of the lubricant over the whole surface.

With these and other objects in view the invention consists in the novel construction and arrangement of parts hereinafter described, illustrated in the accompanying drawings, and particularly pointed out in the appended claims, it being understood that various changes in the form, proportions, and minor details of the structure may be made without departing from the spirit or sacrificing any of the advantages of this invention.

Figure 1:
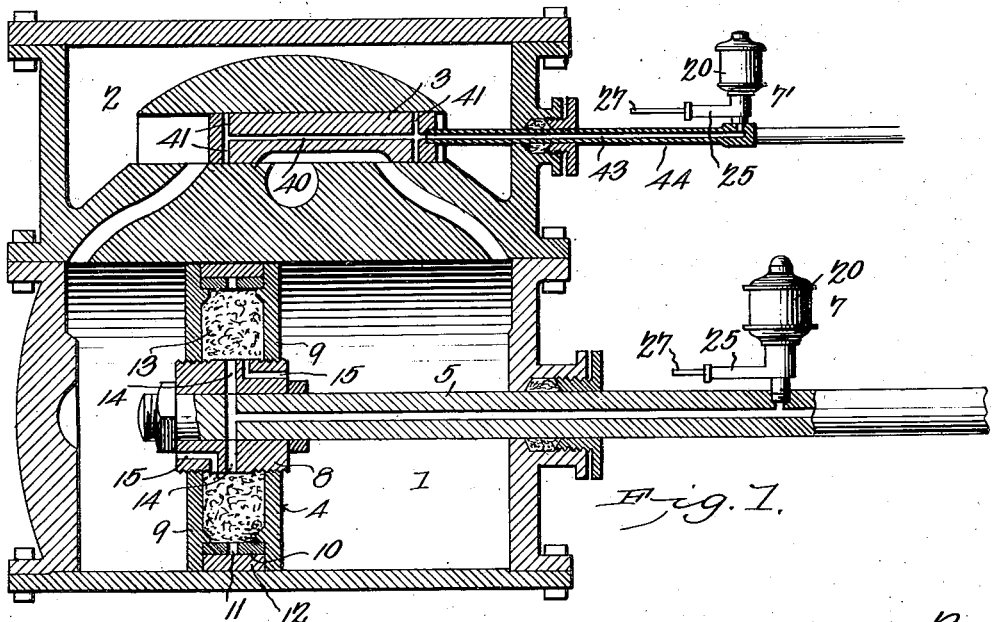
Figure 2:
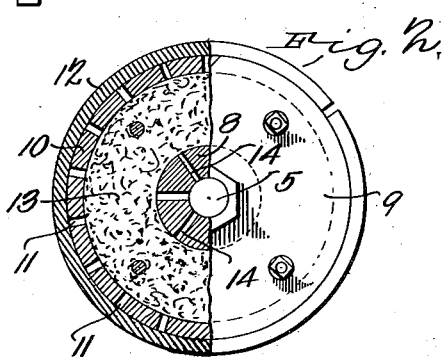
Figure 3:
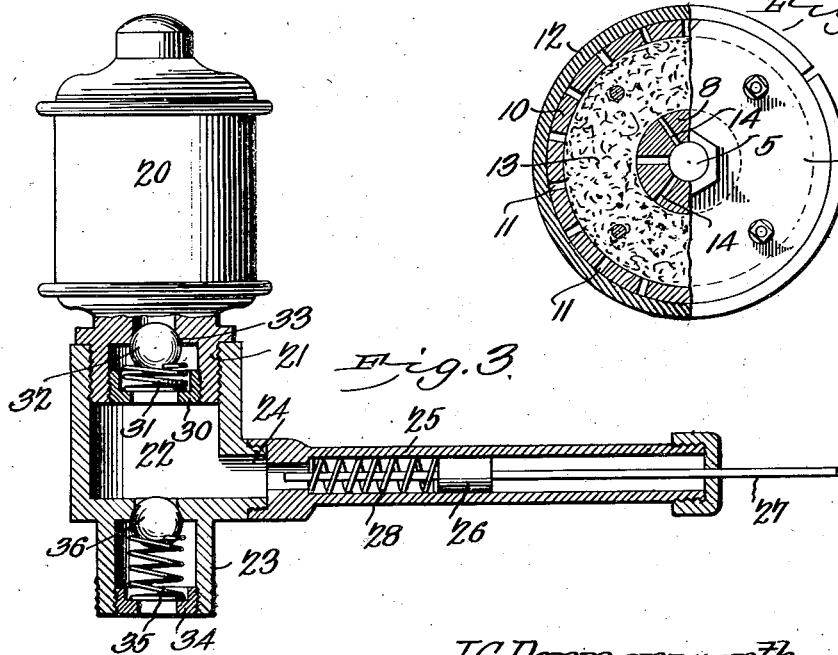

In the accompanying drawings, Figure 1 is a sectional elevation of the cylinder and steam-chest of a steam-engine provided with a lubricating mechanism constructed and arranged in accordance with this invention. Fig. 2 is a transverse sectional elevation of the same on the line 2 2 of Fig. 1. Fig. 3 is a detail section, on an enlarged scale, of the lubricant-pump carried by the movable piston or valve-rod.

Similar numerals of reference are employed to designate corresponding parts throughout the several figures of the drawings.

In the ordinary locomotive-lubricator, where steam and hydrostatic pressure are employed for forcing the lubricating material to the steam-chest and where the steam is employed as a vehicle for the oil, the distribution is uncertain and variable and is not to be relied upon under certain circumstances. When the locomotive is traveling downgrade by gravity and the steam-supply is cut off, the piston and valve still continue to move and there is a tendency of the frictional surfaces to become dry and heated, and, again, when the throttle is full open, as in ascending a grade, the back pressure is at times sufficient to prevent the entrance of the lubricant to the steam-chest. These are practically the critical periods in locomotive-running and the time when lubricant is most required.

In carrying out the present invention it is proposed to supply the lubricating material in unvarying quantities at all times without regard to the steam-pressure, the periods of feeding being automatically controlled by the speed of the engine, so that as the speed increases and there is necessity for a greater quantity of lubricant the periods of feeding will become more frequent and as the speed lessens will be farther apart, and in this connection suitable controlling-valves may be employed in order to regulate a quantity of oil supplied at each reciprocation of the piston and valve.

Referring to the drawings, 1 indicates a steam-engine cylinder above which is mounted an ordinary form of steam-chest 2, the latter being provided with a balanced slide-valve 3 for controlling the inlet and exhaust ports between the steam-chest and the cylinder. In the cylinder is a piston 4, mounted on a piston-rod 5, said piston-rod being provided with a central bore forming a channel for the flow of oil from a pumping mechanism 7, carried by the piston-rod to the interior of the piston. The central hub 8 of the piston is rigidly secured to the piston-rod, and on said hub are secured a pair of spaced disks 9, carrying a ring 10, in which are formed a large number of small perforations 11. The ring 10 is seated slightly within the peripheral line of the disks and forms an annular groove for the reception of one or more packing-rings 12, which may be of the usual construction. Between the disks, the hub, and the ring 10 there is formed an annular space or chamber 13, filled with asbestos, mineral wool, or other fibrous or finely-divided material, to which the lubricant is fed from the piston-rod 26 through a number of radially-disposed passages 14, extending through the piston-rod and the hub 8. The lubricant is fed from the pumping mechanism hereinafter described in predetermined quantities at regular intervals, the quantity being sufficient to maintain the finely-divided material in the chamber 13 in a saturated condition and said material serving to prevent the direct flow of streams of lubricant directly to the periphery of the piston. In the hub 8 are arranged a number of ports or passages 15, leading from both sides of the piston to the chamber 13 in order to permit the entrance of steam from the cylinder to said chamber, and the discharge ends of these ports or passages are in radial lines, so that a number of jets of steam will be directed radially from the hub toward the peripheral line of the piston and will carry with them the lubricating material, the latter being forced through the opening 11 to a point under the packing-ring and thence gradually working out at the opposite edges of the packing-ring and into contact with the bore of the cylinder. The supply is evenly distributed and is at the point where lubrication is necessary, while waste of oil is prevented.

Referring now more particularly to Fig. 3 of the drawings, 20 indicates an oil-cup having a depended threaded stem 21 screwed into the upper end of a barrel 22, the lower portion of which has a depending nipple 23 screwing into an opening arranged in the top of the piston-rod and communicating with the longitudinal oil-channel 6. At one side of the barrel 22 is a perforated boss 24, having a threaded periphery for the reception of one end of a pump-cylinder 25, in which is a plunger 26, mounted on a plunger-rod 27. One end of the plunger-rod is surrounded by a helical compression-spring 28, extending between one side of the plunger and a flange or shoulder near the end of the cylinder, while the opposite end of said plunger extends outside the cylinder and is adapted to come into contact with the flanged nut or the end of the cylinder at each return stroke of the piston. In the depending portion 21 of the oil-cup is screwed a flanged ring 30, forming a seat for one end of a light compression-spring 31, the upper end of which serves to receive a ball-valve 32, normally pressed by said spring against a valve-seat 33 and serving to prevent the flow of oil from the cup except when the plunger 26 is thrown outward by spring 28, this movement creating a partial vacuum in the valve 22 and opening the ball-valve to permit the flow of oil from the cup to the barrel. In the portion 23 of the barrel is screwed a flanged ring 34, forming a seat for the lower end of a compression-spring 35, which supports a ball-valve 36 and presses the latter against a valve-seat 36 formed in the lower wall of the barrel and prevents the passage of oil from the barrel to the longitudinal channel 6 of the piston-rod except during the time the plunger-rod 27 comes into contact with the gland-nut or end of the cylinder and forces the plunger inwardly against the action of the compression-spring 28, this movement serving to positively close the ball-valve 32 and move the ball-valve 36 away from its seat to permit the passage of a stream of oil under pressure from the barrel and pump-cylinder to the piston-rod channel and thence to the piston, the working force exerted by the pump being sufficient to overcome the pressure of steam in the cylinder.

In the valve 3 there is formed a longitudinal bore 40 in communication with a plurality of vertically-disposed channels 41, disposed at any convenient point in the length of the valve, but preferably at points adjacent to the ends thereof, and the central bore communicates with an oil-channel 43, formed in the valve-operating rod 44, and said valve-rod carries a pumping mechanism 7' of a construction similar to that already described. At each reciprocation of the valve the pump is actuated and delivers oil under pressure to the channels formed in the valve, the oil being directed to the upper and lower faces of the valve by the pressure alone or partly by the pressure of the pump and the pressure of the steam.

In the application of the oil-pump where a maximum of efficiency and economy is desired the oil-channel leading to the seat of the valve must be so disposed that when the plunger of the pump is engaged by the gland-nut or the end of the steam-chest the oil-channels will be in direct communication with the friction-surfaces and not over the inlet-ports leading to the cylinders. This applies, of course, where both the valve and the piston are supplied with lubricating devices; but where the valve only has a lubricating mechanism the passages or channels of the valve may be so positioned as to discharge a quantity of oil into the inlet-ports to the cylinder, the passing steam acting as a vehicle for conveying the oil to the piston and walls of the cylinder.

Having thus described the invention, what is claimed is—

1. In an engine-lubricator, the combination with a cylinder, of a hollow piston having a filling of finely-divided material and provided with peripheral oil-discharge openings, a channeled piston-rod secured to the piston, a hub forming a part of the piston and provided with two sets of passages, one set being in communication with the piston-rod channel and the other set with the steam-spaces on both sides of the piston thereby to subject the interior of the piston to constant pressure, and means carried by the rod at a point outside of the cylinder for forcing oil under pressure to the interior of the piston.

2. In an engine-lubricator, the combination with a cylinder, of a hollow piston having a filling of absorbent material to retain a quantity of lubricant that is constantly subjected to steam-pressure tending to force said lubricant to the periphery of the piston, said piston having peripheral discharge-openings for the oil, a channeled piston-rod having passages in communication with the interior of the piston, auxiliary passages leading between the steam-space of the cylinder and the interior of the piston, and means carried by the piston-rod at a point outside the cylinder for forcing oil under pressure to said hollow piston.

3. In an engine-lubricator, the combination with a cylinder, of a channeled piston-rod, a piston-hub secured thereto and provided with radiating passages in communication with the channel of the rod, a pair of disks carried by the hub and provided with annular flanges, a perforated bull-ring supported on said flanges, a packing-ring carried by the bull-ring, steam-passages leading from opposite ends of the hub to the interior of the hollow piston, a packing of absorbent material arranged within said hollow piston and serving as a reservoir for oil, and means carried by the piston-rod at a point outside the cylinder for forcing oil to said hollow piston.

In testimony that I claim the foregoing as my own I have hereto affixed my signature in the presence of two witnesses.

JOHN G. DONNENWERTH.

Witnesses:
R. M. TUNNELL,
FRANS E. LINDQUIST.